United States Patent [19]

Muramatsu

[11] Patent Number: 5,161,035
[45] Date of Patent: Nov. 3, 1992

[54] DIGITAL IMAGE PROCESSING DEVICE FOR ENLARGING ORIGINAL IMAGE WITH HIGH FIDELITY

[75] Inventor: Kiyoji Muramatsu, Nagoya, Japan

[73] Assignee: Brother Kogyo Kabushiki Kaisha, Japan

[21] Appl. No.: 607,170

[22] Filed: Oct. 31, 1990

[30] Foreign Application Priority Data

Oct. 31, 1989 [JP] Japan .................. 1-283443
Dec. 27, 1989 [JP] Japan .................. 1-342556

[51] Int. Cl.⁵ ........................................... H04N 1/393
[52] U.S. Cl. ..................................... 358/451; 382/47
[58] Field of Search .......... 358/451, 448; 382/8, 382/47, 49-54

[56] References Cited

U.S. PATENT DOCUMENTS

| | | | |
|---|---|---|---|
| 4,084,195 | 4/1978 | Pireira | 358/448 |
| 4,872,064 | 10/1989 | Tutt et al. | 358/451 |
| 4,885,786 | 12/1989 | Anderson et al. | 358/451 |
| 4,991,004 | 2/1991 | Hayashi et al. | 358/451 |
| 4,991,029 | 2/1991 | Motoki et al. | 358/448 |

*Primary Examiner*—Stephen Brinich
*Attorney, Agent, or Firm*—Oliff & Berridge

[57] ABSTRACT

A digital image processing device for enlarging an original image with high fidelity. To produce digital data representative of an enlarged image based on digital data representative of an original image, 2-by-2 enlarged image data is firstly produced, for example, through computation of approximate surface representative of density distribution of the original image approximate to a surface covering all density values. Based on the 2-by-2 enlarged image data, another approximate surface covering all density values of control points selected from the pixels constituting the 2-by-2 enlarged image. Then, a center portion of the thus obtained approximate surface is enlarged to a desired size and four center portions of such enlarged approximate surface are obtained while selecting the control points on one pixel shifted positions in row and column on the 2-by-2 enlarged data. The thus obtained four center portions are averaged, which gives the image data representative of the enlarged image.

8 Claims, 10 Drawing Sheets

DIGITAL IMAGE PROCESSING DEVICE FOR ENLARGING ORIGINAL IMAGE WITH HIGH FIDELITY

BACKGROUND OF THE INVENTION

The present invention relates to a digital image processing device for enlarging an original image with high fidelity. More particularly, the invention relates to a digital image processing device wherein an original digital image is enlarged to a desired magnitude while maintaining an image density distribution unchanged.

An original image to be processed is composed of a multiplicity of density-imposed pixels arranged in row and column. According to a conventional technique, to enlarge the original image, new pixels are inserted between adjacent two old pixels existing in horizontal direction (X-direction), vertical direction (Y-direction) and in an oblique direction while imposing density data equal to that of adjacent one of two old pixels upon the new pixel or inserting average density data of a plurality of neighboring pixels thereupon. Through such a processing, the original image can be enlarged to a desired size depending upon the number of newly introduced pixels relative to the number of old pixels.

However, according to the conventional technique, jaggy or minute stepwise imaging portion may be generated at an oblique or curving line upon image enlargement. Therefore, it would be difficult to produce a clear and precise enlarging image. Further, if clear enlargement is to be reproduced, an image inputting device having extremely high resolving power is required, to thereby render the resultant digital image processing device expensive.

SUMMARY OF THE INVENTION

It is therefore, an object of the present invention to provide an improved digital image processing device capable of providing a clear output enlarging image without any image jaggy portion at an oblique line portion or a curve portion.

To achieve the above and other objects, there is provided, as shown in FIG. 1, an image processing device for producing second digital data based upon first digital data, wherein the first digital data represents an original image composed of a first multiplicity of pixels arranged in row and column, each pixel having a density value, and the second digital data represents a C-by-C times enlarged image relative to a size of the original image, the C-by-C times enlarged image being composed of a second multiplicity of pixels arranged in row and column, each pixel having a density value, the device comprising:

(1) first digital data storing means for storing the first digital data;

(2) first approximate surface computing means (first computing means) for computing a first approximate surface approximate to a surface covering all density values of first control points, a group of A-by-A adjacent pixels arranged in row and column being selected as the first control points from the first multiplicity of pixels, the first approximate surface having a center portion, A being an integer equal to or greater than 2;

(3) first enlarging means for producing a 2-by-2 times enlarged center portion while sampling the center portion of the first approximate surface to obtain 2-by-2 sampled values;

(4) 2-by-2 times enlarged image data computing means (second computing means) for computing third digital data representative of a 2-by-2 times enlarged image by non-overlappingly combining the 2-by-2 times enlarged center portions produced by the first computing means and the first enlarging means while selecting different groups of A-by-A adjacent pixels arranged in row and column, the different groups of A-by-A adjacent pixels being displaced on pixel-to-pixel basis from the group of A-by-A adjacent pixels in directions of row and column, the 2-by-2 times enlarged image being composed of a third multiplicity of pixels arranged in row and column;

(5) second approximate surface computing means (third computing means) for computing a second approximate surface approximate to a surface covering all density values of second control points, a group of B-by-B pixels arranged alternately in row and column being selected as the second control points from the third multiplicity of pixels, the second approximate surface having a center portion corresponding to the center portion of the first approximate surface, B being an integer equal to or greater than 2;

(6) second enlarging means for producing a C-by-C times enlarged center portion while sampling the center portion of the second approximate surface to obtain C-by-C sampled values, C being an integer equal to or greater than 2; and (7) C times enlarged image data computing means (fourth computing means) for computing the second digital data, wherein four C-by-C times enlarged center portions are produced by the third computing means and the second enlarging means with respect to each of the first multiplicity of pixels while selecting different groups of B-by-B pixels arranged alternately in row and column, the different groups of B-by-B alternately arranged pixels being displaced from the group of B-by-B alternately arranged pixels by one pixel in directions of row, column, and row and column, and an average value of four C-by-C times enlarged center portions is used as a basis for the second digital data.

In the image processing device thus arranged, the first approximate surface computing means (first computing means) computes the first approximate surface with respect to a part of the original image and the first enlarging means enlarges the center portion of the first approximate surface and obtains 2-by-2 sampled values. The same matrix of A-by-A pixels are successively selected as the first control points while shifting in the direction of row on pixel basis from one end to the other to obtain a plurality of first approximate surfaces. Next, from a position one pixel shifted in the direction of column, the same processing is repeated carried out. In this manner, computation of the first approximate surface is carried out with respect to all over the region of the original image. The respective center portions of the first approximate surfaces are subjected to enlargement by the first enlarging means and the 2-by-2 times enlarged image data are produced by combining the 2-by-2 times enlarged center portions in non-overlapping relation. In the above described processing, the first approximate surface can be computed in different order. Specifically, the scanning direction to select the matrix of A-by-A pixels can be reversed.

Next, the second approximate surface computing means (third computing means) selects a group of B-by-B pixels arranged alternately in row and column as the second control points form the pixels constituting the 2-by-2 times enlarged image and computes a second approximate surface covering all the density values of the second control points. Since alternately arranged pixels are selected as the second control points, the second approximate surface does not represent the density distribution of the 2-by-2 times enlarged image but represent the density distribution of the original image. The second enlarging means enlarges the center portion of the second approximate surface to C-by-C times enlarged size. The second control points in one pixel shifted positions in the directions of the row and column are successively selected, to thereby obtain four-number C-by-C times enlarged center portions. As a result, one fourth of each of four C-by-C times enlarged center portions are superposed one on the other. Therefore, the density values in the C-by-C times enlarged surface are added with respect to each pixel and then the resultant value is divided by four, whereby an average density value of each pixel is obtained. A groups of such average density values indicate the image data of the C-by-C times enlarged image which are a high level approximation of the original image.

While the C-by-C times enlarged image data can be obtained by directly enlarging the first approximate surface to C-by-C times enlaged size, this is not advisable, since the degree of approximation is degraded in the oblique direction of the image. In contrast, according to the present invention, such a problem does not occur.

In the above description, for the sake of simplicity, it has been described so that the four of the C-by-C times enlarged center portion overlappes with respect to each pixel. However, with respect to the pixels existing in the edges of the C-by-C times enlarged image, the overlapping number of the C-by-C times enlarged center portions is not necessarily four but it may be one, two or three. From the theoretical point of view, the average value should be computed by dividing with the overlapping number. Since such processing is complicated and troublesome, the data in such a location may simply be avolished or replace it with the adjacent pixel data.

According to another aspect of the present invention, there is provided an image processing device for producing second digital data based upon first digital data, wherein the first digital data represents an original image composed of a first multiplicity of pixels arranged in row and column, each pixel having a density value, and the second digital data represents a C-by-C times enlarged image relative to a size of the original image, the C-by-C times enlarged image being composed of a second multiplicity of pixels arranged in row and column, each pixel having a density value, the device comprising:

(1) storing means for storing the first digital data, producing means for producing 2-by-2 times enlarged image data by inserting new pixels to be arranged alternately with respect to the pixels of the arrangement of the original image, a density value of each of the newly inserted pixcel being equal to one of adjacent pixels;

(2) first computing means for computing an approximate surface approximate to a surface covering the density values of control points, a group of B-by-B pixels arranged alternately in row and column and corresponding to the pixels of the original image being selected as the control points from the pixels of the 2-by-2 times enlarged image data, B being an integer equal to or greater than 2;

(3) enlarging means for producing a C-by-C times enlarged center portion while sampling the center portion of the second approximate surface to obtain C-by-C sampled values, C being an integer equal to or greater than 2; and (4) second computing means for computing the second digital data, wherein four C-by-C times enlarged center portions are produced by the second computing means and the enlarging means with respect to each of the first multiplicity of pixels while selecting different groups of B-by-B pixels arranged alternately in row and column, the different groups of B-by-B alternately arranged pixels being displaced from the group of B-by-B alternately arranged pixels by one pixel in directions of row, column, and row and column, and an average value of four C-by-C times enlarged center portions is used as a basis for the second digital data.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Figure 1:
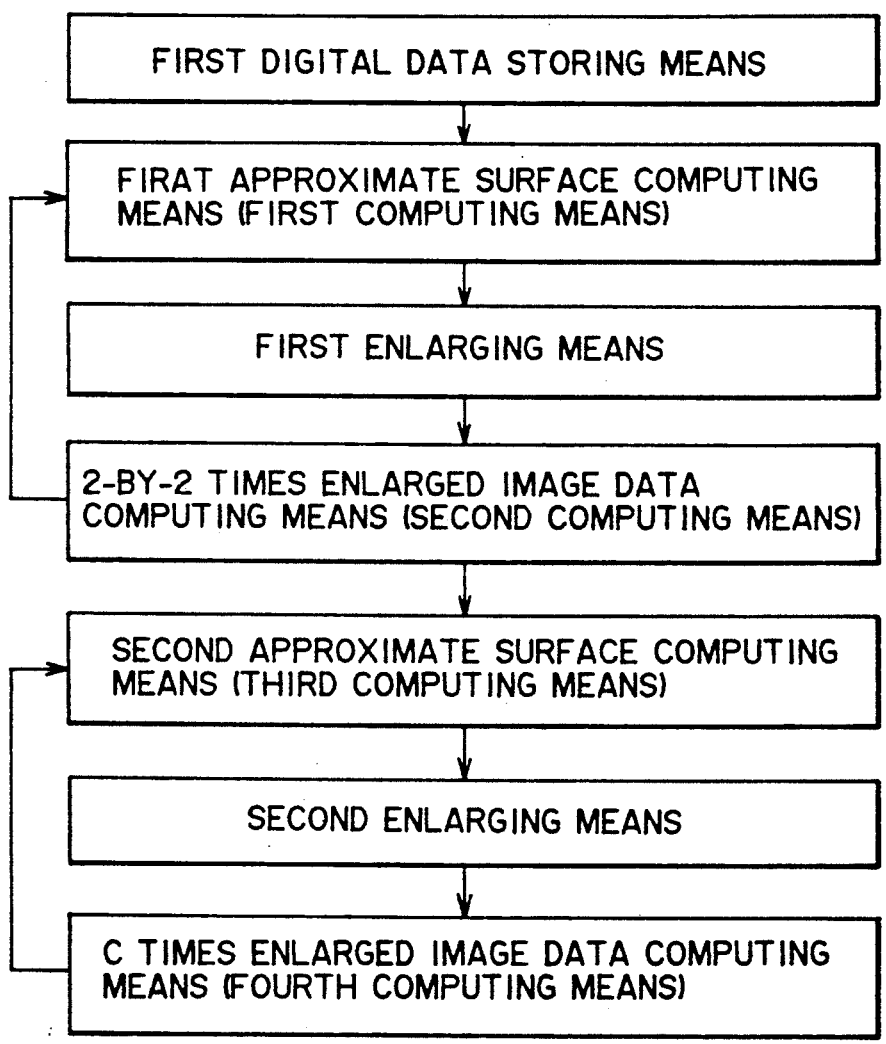
FIG. 1 is a block diagram showing an overall arrangement of a digital image processing device according to this invention.
Figure 2:
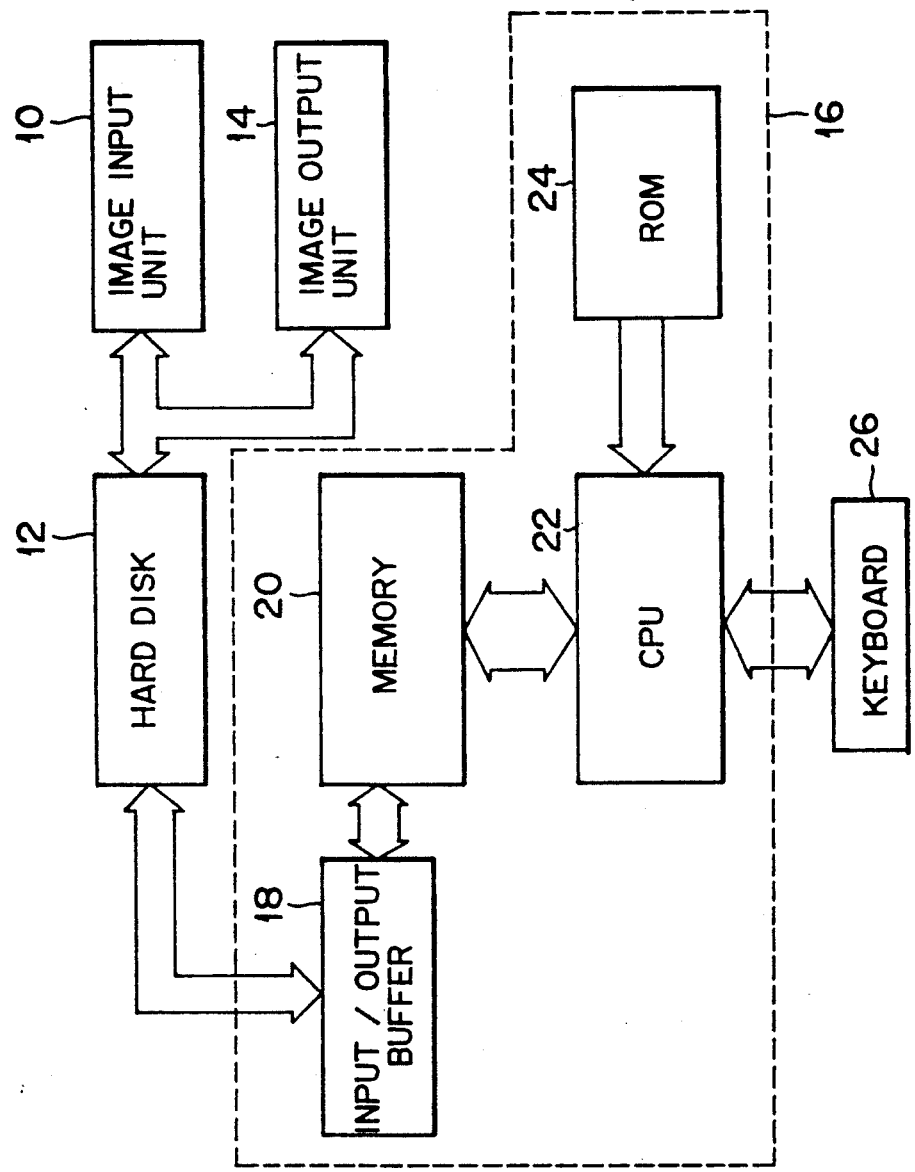
FIG. 2 is a block diagram illustrating an inventive concept according to a first embodiment of the present invention.

FIG. 1 shows an overall arrangement of a digital image processing device for embodying the present invention. In the processing device, an image input unit 10 and an image output unit 14 are connected to a hard disk 12. As the image input unit 10, available are a color scanner, a television signal supplying source and any kind of a device capable of supplying a gradation-processed digital signal. As the image output unit 14, available are a color printer, a CRT display or the like.

Figure 11:
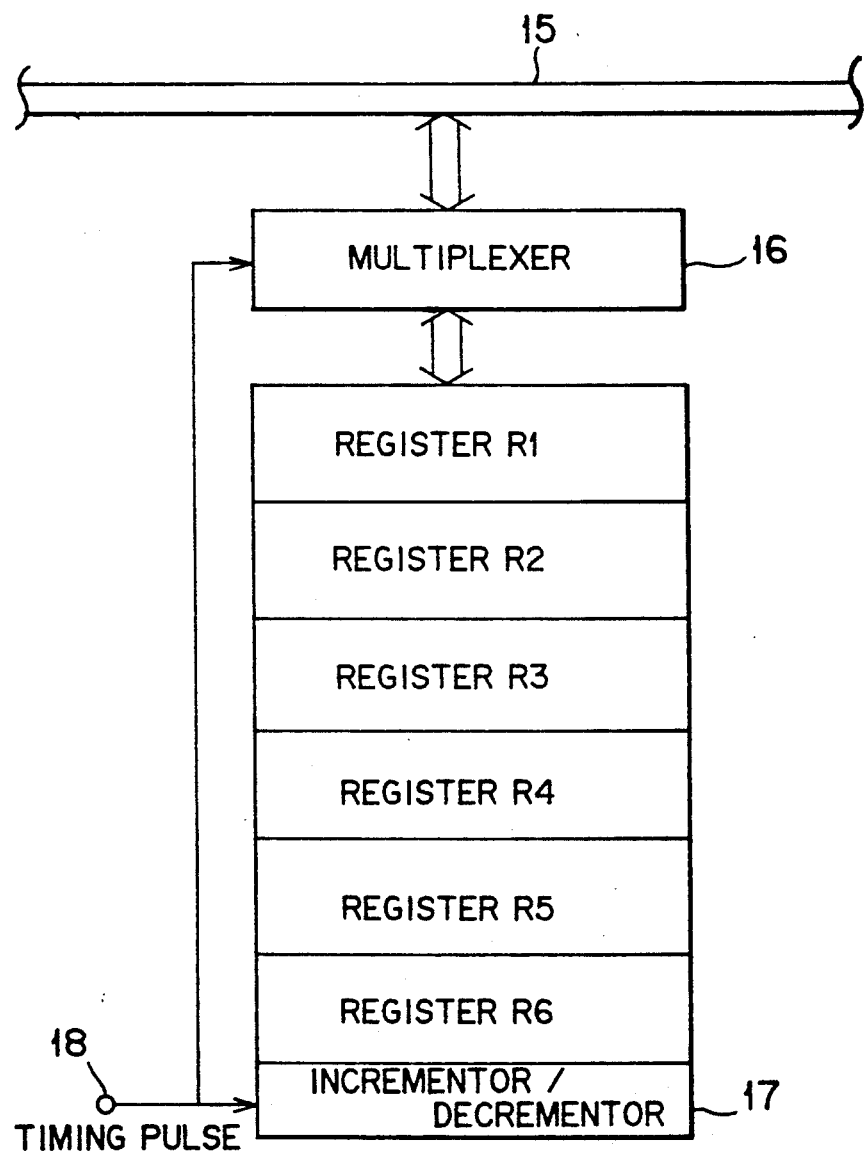
FIG. 11 is a block diagram showing a resisters used in the digital image data processing.

The hard disk 12 is connected to a digital image processing device 16 through a bus. The processing device 16 includes an input/output buffer 18 serving as a work memory, a memory such as a RAM (random access memory) 20, a CPU (central processing unit) 22, and a ROM (read-only memory) 24. The input/output buffer 18 is connected to the hard disk 12. The buffer 18 temporarily stores therein input/output data. The input/output buffer 18 is connected to the memory 20 (RAM) which is provided with storage locations in which original image data and computing data are stored. Details of the memory 20 is shown in FIG. 11. In the memory 20, a plurality of resisters R1 through R6 are connected to an internal data bus 15 through a multiplexer 16, and are controlled by an incrementer/decrementer 17 operable in response to a timing pulse sent from the CPU 22. Each of the resisters R1 through R6 is adapted for storing therein various image data.

The memory 20 is connected to the CPU 22. The CPU 22 fetches an original image data stored in the memory 20, executes a predetermined computation, and outputs the computation result to the memory 20. The computation is executed in accordance with a program stored in the ROM 24 connected to the CPU 22. The CPU 22 also controls the operational timings of the digital image processing device 16 in addition to the above described computations. Further, an input device 26 such as a keyboard and a mouse is connected to the CPU 22 for inputting data required in the image processing.

Figure 3A:
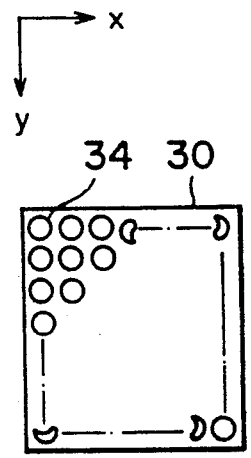
FIGS. 3A and 3B are explanatory diagrams for description of a double size enlargement relative to an original image.

Next, operation of the digital image processing device will be described. The input image data inputted from the image input unit 10 is stored in the hard disk 12. The input image data stored therein is then fetcd and sent to the memory 20 for storage as the original image data (an original image 11 is shown in FIG. 3A) through the input/output buffer 18. After data representative of an image magnification ratio is inputted from the keyboard 8, the original image data stored in the memory 20 is fetched by the CPU 6, and is computed by the CPU 6 in accordance with the program stored in the ROM 7. The computed data is successively stored in the memory 20. When all computations are completed, the computed data stored in the memory 20 are then stored in the hard disk 12 as an output image data through the input/output buffer 18. The output image data thus stored in the hard disk 12 is outputted from the image output unit 14.

A first embodiment of the present invention will now be described with reference to the accompanying drawings.

Figure 3B:
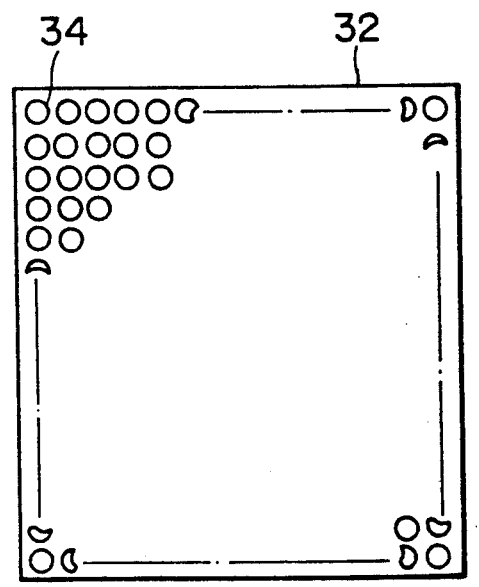

As shown in FIG. 3A, the digital image processing device 16 implements processing of an image data to provide an enlarged image 32 shown in FIG. 3B based on an original image 30 shown in FIG. 3A. The original image 30 is composed of a multiplicity of pixels each having its own density. The position of each pixel 34 is defined by X- and Y-coordinates and the density of the pixel 34 is defined by a coordinate value in Z-axis perpendicular to the plane defined by the X- and Y- axes. Each pixel 34 on the original has a density of one of a predetermined number of discrete values (e.g. 256) and the density thereof is read by the image input unit 10 and stored in the hard disk 12 as an original image data.

Figure 4:
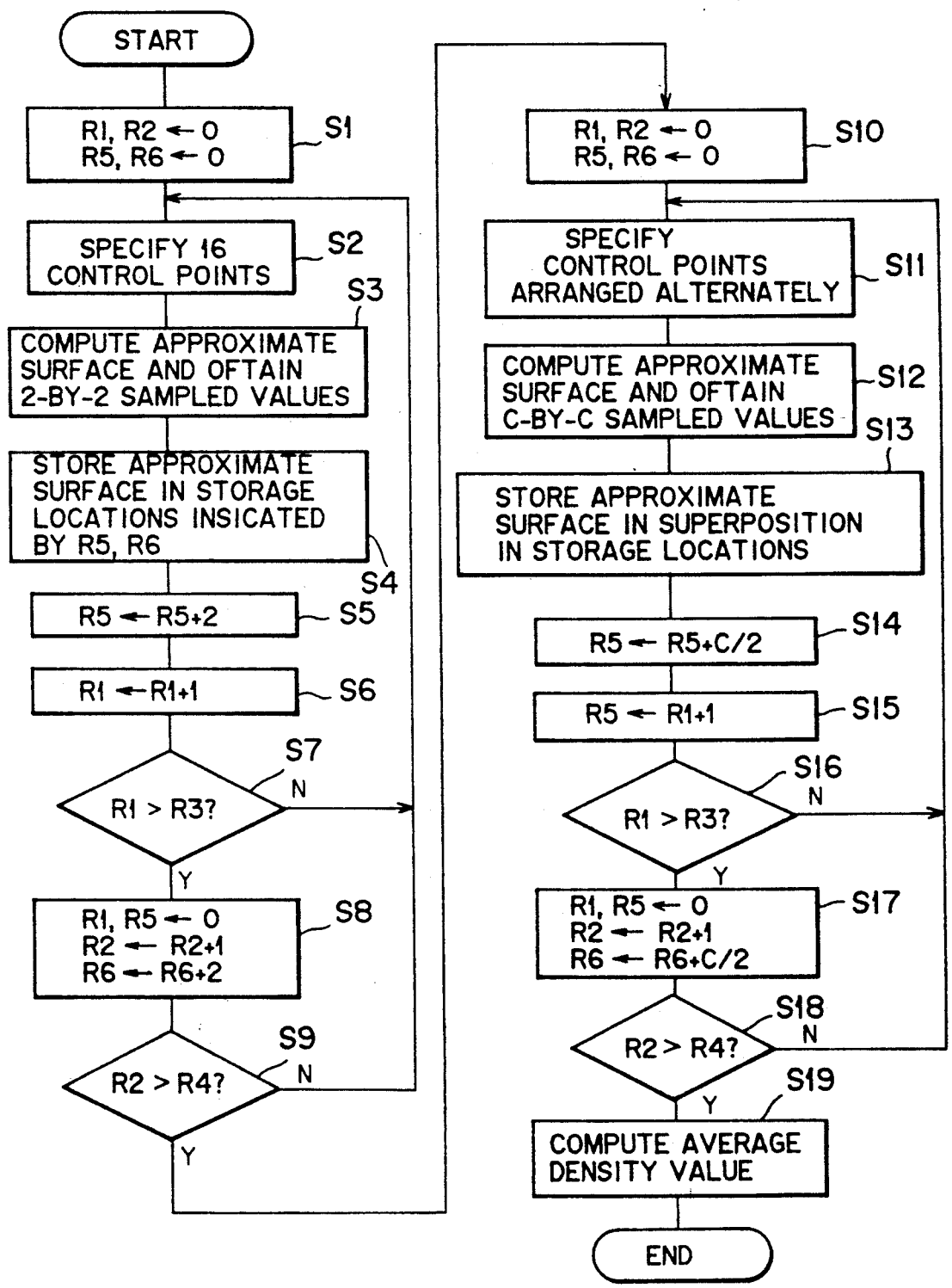
FIG. 4 is a flow chart for description of an operational sequence according to the first embodiment of the present invention.

The processing of the original image data is implemented in accordance with the control program stored in the ROM 24 as illustrated in the form of a flow chart in FIG. 4. Outline of the processing will firstly be described with reference to FIGS. 5 through 8.

Figure 5:
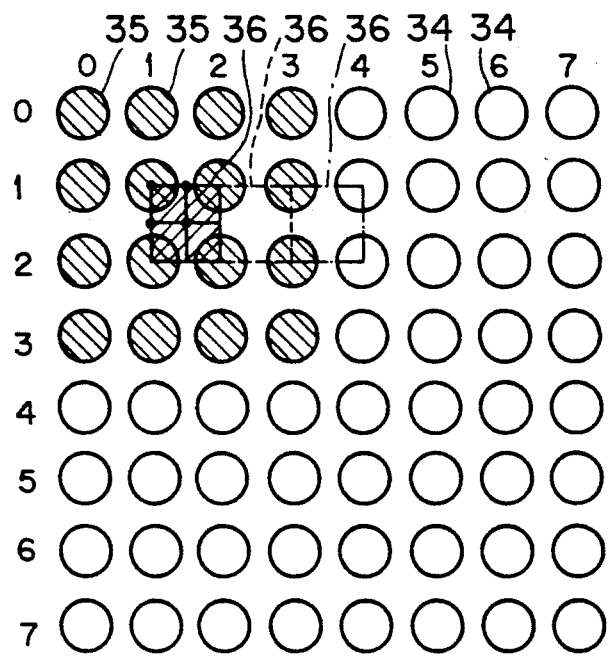
FIGS. 5 and 6 are explanatory diagrams for description of a process for forming a double size enlargement.

As shown in FIG. 5, the 4-by-4 of 16 pixels in the left upper portion of the original image 30, which are indicated by hatching, are given as control points 35 (first control points) and a bicubical spline surface is obtained which is approximate to a surface defined by the densities in the control points 35. The surface is expressed by the following equation:

$$P_{ij}(u,v) = [u^3 u^2 u 1] N_R Q_R N_R^T X [v^3 v^2 v 1]^T$$

$$N_R = \begin{bmatrix} -1/6 & 1/2 & -1/2 & 1/6 \\ 1/2 & -1 & 1/2 & 0 \\ -1/2 & 0 & 1/2 & 0 \\ 1/6 & 2/3 & 1/6 & 0 \end{bmatrix}$$

$$Q_R = \begin{bmatrix} Q_{00} & Q_{01} & Q_{02} & Q_{03} \\ Q_{10} & Q_{11} & Q_{12} & Q_{13} \\ Q_{20} & Q_{21} & Q_{22} & Q_{23} \\ Q_{30} & Q_{31} & Q_{32} & Q_{33} \end{bmatrix}$$

where $0 \leq u \leq 1$, $0 \leq v \leq 1$, and $P_{ij}$ indicates a surface position indicated by (i, j).

Next, by utilizing the bicubical spline surface thus obtained, image data representative of 2-by-2 enlarged image are obtained. To this end, the bicubical spline surface in the hatched rectangular region 36 is subjected to sampling to obtain 2-by-2 sampled values. The lower and right side lines of the hatched rectangular region 36 are not used for sampling so as not to be overlappingly used in the subsequent sampling operation. That is, the density values on the four points indicated by dots in FIG. 5 are used for computation. The 16 control points 35 shown in FIG. 5 corresponds to the pixels 34 arranged alternately in the horizontal and vertical directions shown in FIG. 6. As a result, each of the horizontal and vertical lengths of the region 36 is doubled and thus an enlarged square region 38 is obtained.

Figure 6:
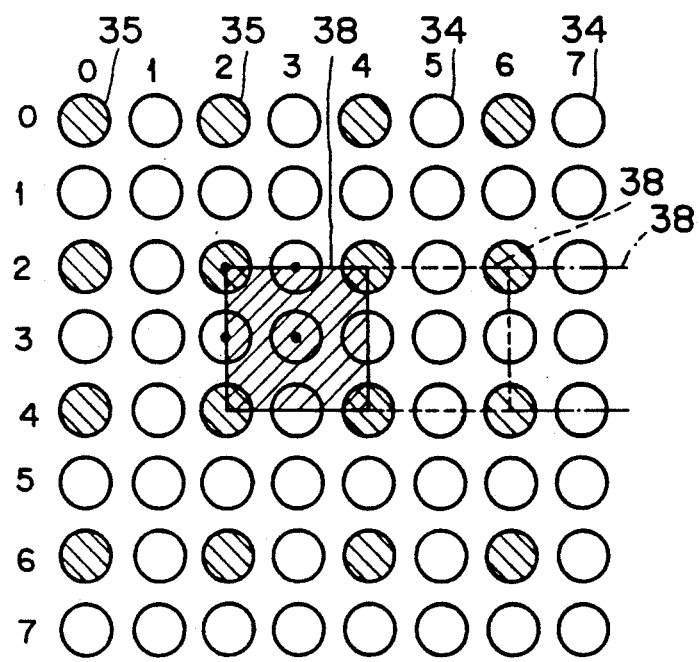

The same processing is repeatedly carried out while shifting the region 36 in the horizontal direction on one pixel basis as indicated by dotted and one-dotted-chain lines in FIG. 5. Then, as shown in FIG. 6 with dotted and one-dotted-chain lines, the 2-by-2 times enlarged region 38 are obtained which indicates the density of each pixel. Upon carrying out the same processing for all over the regions of the original image 30, 2-by-2 enlarged image data are obtained.

Then, by the selection of alternately arranged 16 control points (second control points) 35 on the 2-by-2 times enlarged image data, bicubical spline surface is computed which is defined by those control points 35 and is sampled within the region 38 to obtain sampled density values, the number of the sampled density values to be obtained corresponding to the magnification ratio. In the 2-by-2 times enlarged image, since the control points 35 are selected alternately, the approximate surface obtained by the computation does not represent the density distribution of the 2-by-2 times enlarged image but the density distribution of the original image.

Figure 7:
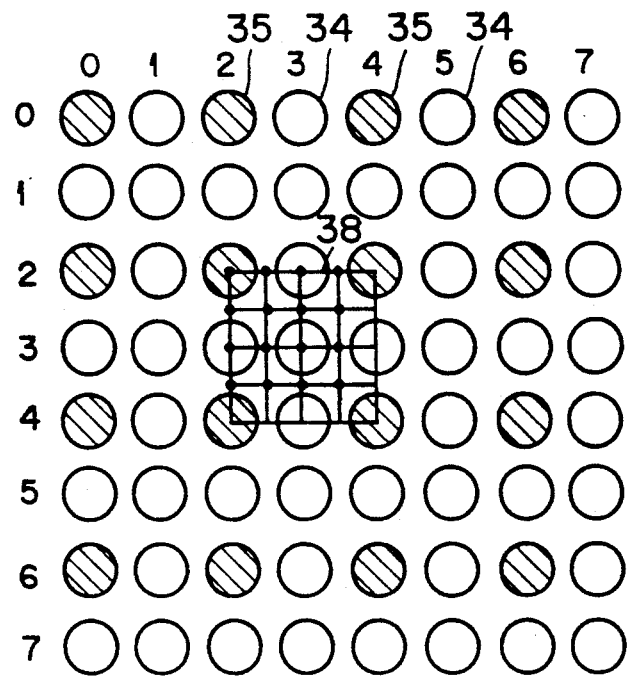
FIGS. 7 and 8 are explanatory diagrams for description of a process for forming a quadruple size enlargement.

FIG. 7 shows an example in which the original data is finally enlarged to 4-by-4 times. The approximate surface corresponding to the region 38 is sampled to obtain 4-by-4 of 16 sampled values. The lower and the right sides of the region 38 are not used for sampling so as to avoid duplicate sampling performed in the adjacent region 38. 16 density values in the points indicated by dots in FIG. 7 are used for computation.

Figure 8:
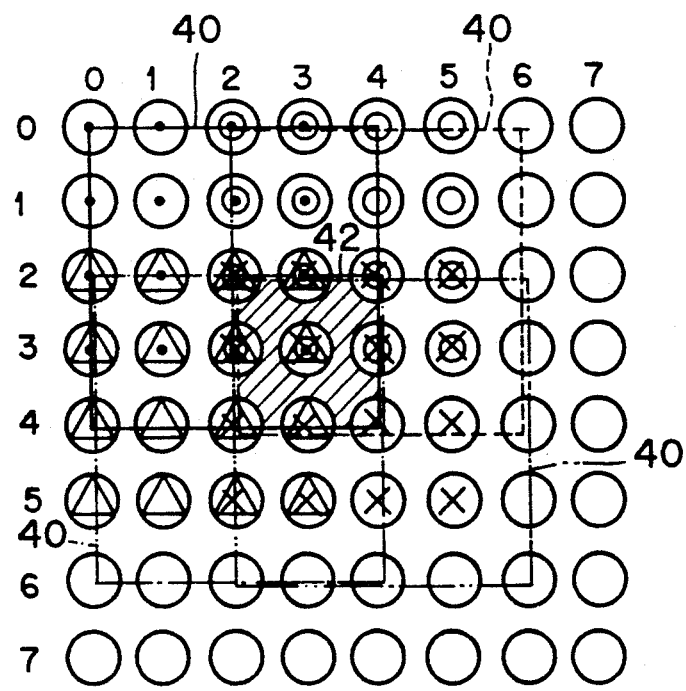

The similar sampling is carried out while selecting different groups of the control points in one pixel shifted positions in right, lower, and right-lower with respect to the original group of the control points. The resultant density distributions within the respective regions 40 are added, with the result that the density distributions in the hatched square region 42 shown in FIG. 8 are added four times. In actuality, the densities of the pixels 34 indicated in FIG. 8 with dot, circle, triangle and cross marks are added, and the densities of the pixels which are added four times attendant to the shifting selection of the control points are for the four pixels which are overlappingly indicated with dot, circle, triangle and cross marks.

The above described operations are carried out for all over the region while shifting the region 39 in horizontal and vertical directions on one pixel basis, four density values are added with respect to each of the pixels 34 except those located in the edge portions of the enlarged image 32. The four times added density value is divided by four, thereby giving an average density value with respect to each pixel.

The above described image data processing will be described with reference to the flow chart shown in FIG. 4. The reference characters used in the flow chart indicate the following contents.

R1 is a register for registering an X coordinate value of the control point 35 in the leftside upper position.

R2 is a register for registering a Y coordinate value of the control point 35 in the leftside upper position.

R3 is a register for registering a size of the original image 30 or the double enlarged image in the horizontal direction.

R4 is a register for registering a size of the original image 30 or the double enlarged image in the vertical direction.

R5 is a register for registering an X coordinate value of a pointer which indicates the left-upper position of the regions 36, 38 or 40 of the original image 30, double enlarged image or enlarged image 32.

R6 is a register for registering a Y coordinate value of the pointer.

Upon start of the processing, the values of the registers R1, R2, R5 and R6 are set to zero in step S1. Next, in step S2, 4-by-4 of 16 control points 35 are specified, wherein the control point represented with (0, 0) by the registers R1, R2 is located in the leftside upper position on the X-Y coordinates. The original image data indicative of the density of the original image are read out of the memory 20. Next, in step S3, a computation is performed to obtain a bicubical spline surface which is a approximate surface covering all the density values in the 16 control points 35, and the center portion of the region 36 shown in FIG. 5 which region corresponds to the bicubical spline surface is subjected to sampling to obtain 2-by-2 of 4 sampled values. The thus obtained sampled values are given in correspondence to the nonhatched alternately arranged pixels. Further, computation is performed to obtain another bicubical spline surface covering all the sampled values which represent density values. In step S4, the density values obtained in step S3 are stored so as to have a relation to the position of the pointer, i.e., the X and Y coordinates values in the registers R5 and R6 which values are in the present case (0, 0).

Next, in step S5 the value of the register R5 is incremented by 2 and in step S6 the value of the register R1 is incremented by 1. In step S7, it is checked whether or not the value of the register R1 is greater than the value of the register R3 which indicates the size of the original image 30 in the horizontal direction. The size thereof is (N−1) assuming that N number of pixels are arranged in the horizontal direction. Therefore, the value of the register R1 does not exceed the value of the register R3 until the position of the rightmost pixel is registered in the register 1. The decision made in step S7 indicates NO for the time being, so that the routine returns to step S2. The processings in steps S2 through S5 are repeatedly executed each time a different group of 16 control points are specified which are in the rightwardly one pixel shifted positions.

When the region 36 goes beyond the rightmost pixel position, the decision made in step S7 indicates YES. In step S8, the values of the registers R1, R5 are reset to zero, the value of the register R2 is incremented by 1, and the value of the register R6 is incremented by 2. Specifically, the values of the respective registers are altered so that the 4-by-4 the control points return to the left and is shifted downwardly by one pixel and that the region 38 returns to left and is shifted downwardly by two pixels. In step S9, it is checked whether or not the value of the register R2 is greater than the value of the register R4. Specifically, it is checked if the region 36 is shifted beyond the lowermost position of the original image 30. Since the decision made in step S9 is NO for the time being, the routine returns to step S2. The processings from steps S2 through S8 are repeatedly executed. All the necessary values of the bicubical spline surface on the 2-by-2 enlarged image are obtained when the decision made in step S9 indicates YES. The groups of the bicubical spline surfaces represent the 2-by-2 enlarged image data.

In steps S10 through S18, image enlarging processing is carried out wherein the original image is enlarged with a desired magnification. Firstly, description will be made with respect to enlarging processing for enlarging the original image 30 to 4-by-4 times enlarged size.

In step S10, the values of the registers R1, R2, R5 and R6 are reset to zero. In step S11, as shown in FIG. 7, 16 pixels arranged alternately in both horizontal and vertical directions are determined as control points 35, wherein the position (0, 0) indicated by the registers R1, R2 used for the 2-by-2 times enlarged image identifies the left-upper position. Next, in step S12, computation is implemented to obtain C-by-C sampled values on the bicubical spline surface are obtained. Since C is equal to 4 in this instance, 4-by-4 of 16 density values are obtained. The lower and right sides of the region 38 are not used for sampling, so the computation is implemented with respect to 16 points indicated by dots in FIG. 7. In step 13, the computed density values are stored in the storage region identified by the values in the registers R1 and R2, which values are (0, 0) representing the left-upper position of the region 40. Specifically, the density values of 16 pixels indicated by dots in FIG. 8 are stored in the relevant storage locations.

Next, in step S14 the value of the register R5 is incremented by C/2, and in step S15, the value of the register R1 is incremented by 1. In step S16, it is checked whether the horizontal shifting has completed. The decision made in step S16 indicates NO for the time being, the routine returns to step S11. Through the executions of steps S11 through S13, the density values of 4-by-4 pixels indicated by circles in FIG. 8 are stored. With respect to the pixels whose density values have already been stored, the newly obtained density values of the same pixels are added to the previously stored values.

The similar processings are repeatedly carried out. When the decision made in step S16 indicates YES, the values of the registers R1 and R5 are reset to zero, the values of the registers R2 and R6 are incremented by 1 and C/2, respectively. In step S18, it is checked whether the vertical shifting is complete. The decision made in this step is NO for the time being, so the routine returns to step S11. Thereafter, the same processings are repeatedly carried out. Upon completion of the image data processing with respect to all over the region of the 2-by-2 times enlarged image, the decision made in step S18 is turned to YES. Then, in step S19, the added density value of each pixel is divided by 4, thereby providing an average density value thereof, whereby the execution of the program is ended. A group of the average density values thus obtained give image data regarding 4-by-4 times enlarged image which is the final product.

Figure 9:
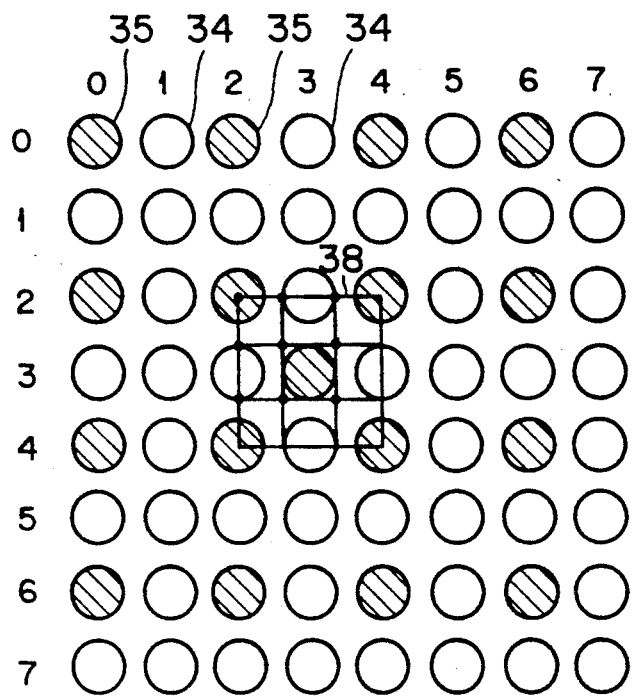
FIGS. 9 and 10 are explanatory diagrams for description of a process for forming a trice size enlargement.
Figure 10:
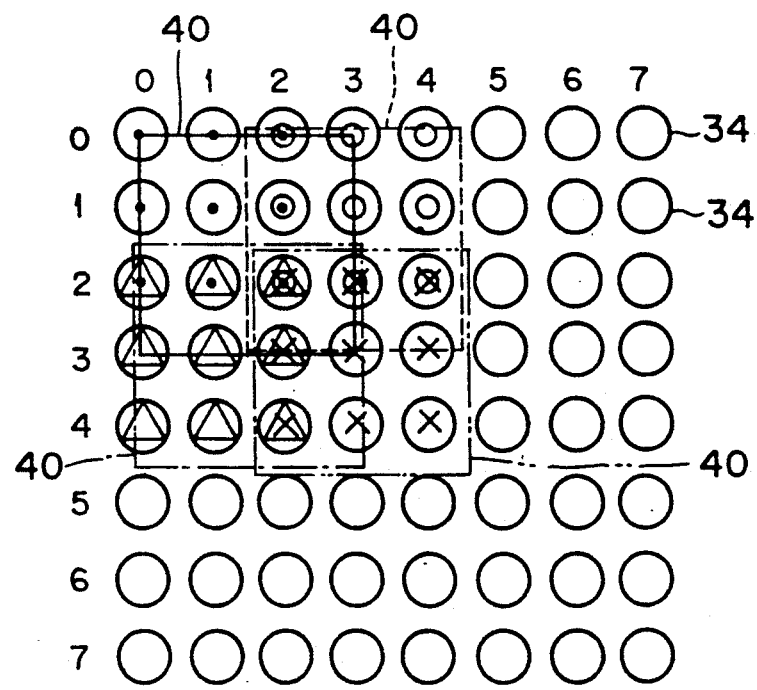

While description has been made with respect to the processing for enlarging the original image 30 to 4-by-4 enlarged size, a 3-by-3 enlarging processing is illustrated in FIG. 9. As shown therein, the center portion in the region 38 of the 2-by-2 times enlarged image which region 38 corresponds to the bicubical spline surface is sampled to obtain 3-by-3 sampled values. Specifically, computation is performed to obtain the values on the spline surface at positions indicated by dots in FIG. 9, and the resultant density values are stored in the corresponding storage location as shown in FIG. 10. The similar processing is repeatedly carried out with respect to all over the region of the 2-by-2 time enlarged image while selecting different groups of 16 control points successively shifted by one pixel in the horizontal and vertical directions. The resultant density values are added while incrementing the values of the registers R5 and R6 by C/2, i.e., 1.5, whereby four density values are added with respect to each pixel except those located in the edge portion of the image. An average density value of each pixel is obtained by dividing the added density value by 4, thereby giving image data regarding the 3-by-3 times enlarged image.

Quite similarly, to obtain a 2-by-2 times enlarge image, the center portion of the bicubical spline surface corresponding to the region 38 in the 2-by-2 enlarged image is sampled to obtain 2-by-2 sampled values, and the resultant values are added while incrementing the values of the registers R5 and R6 by C/2, i.e. 1. The density value of each pixel obtained by the addition of four values is divided by 4, thereby giving an average density value of each pixel and thus the image data of the 2 times enlarged image which is the final product.

As described above, the memory 20 serves as the first digital data storing means, and the processing steps S2 and S3 executed by the digital image processing device 16 serves as the first approximate surface computing means (first computing means) and the first enlarging means. The processing in steps S1 and S4 through S9 executed thereby serves as the 2-by-2 times enlarged image data computing means (second computing means). Further, the processing in steps S11 and 12 serves as the second approximate surface computing means (third computing means) and second enlarging means. The processing in steps S10 and S13 through S19 serves as the C times enlarged image data computing means (fourth computing means).

While description has been made with respect to the use of the bicubical spline surface as an approximate surface, other surfaces such as bicubical Bezier surface and biquadratic surface are also available. Further, the first and second approximate surfaces as computed are independent of each other, so the definition of the surfaces can be made different.

In the first embodiment, even in the cases of enlargement of the original image with a small number of magnification, for example, to double or that extent, the steps S10 through S19 are executed, the processings in these steps can be dispensed with to thereby shorten the processing time, since the jagging is not notable in the case of such a low magnification. To this effect, it is necessary that a new step be inserted after the step S9 for checking if the magnification is above a predetermined number. If the decision made in this newly introduced step indicates NO, then the routine may be ended by skipping the steps S10 through S19.

Next, a second embodiment of the present invention will be described with reference to FIGS. 11 through 15. According to the second embodiment, a 2-by-2 times enlarged image 14 is provided based on the original image 30, and then, bicubical spline surface is applied as an approximate surface based on the 2-by-2 times enlarged image 14, and finally, the original image 30 is enlarged by N times.

Firstly, description will be made with respect to a process for providing a 2-by-2 times enlarged image 14. Each of the pixels 34 of the original image 30 shown in FIG. 3A is represented by $a_{xy}$, and a position of the pixel in the direction of row (X-axis) is registered in the register R1 of the memory 20 and a position thereof in the direction of column (Y-axis) is registed in the register R2. Further, a widthwise size of the original image 30 is registered in the register R3 and a vertical size of the original image 30 is registered in the register R4. Furthermore, an X-axis position of a pointer, which indicates a storage location of the pixel 34 in the memory 20, is registered in the register R5, and a Y-axis position thereof in the register R6.

Figure 12:
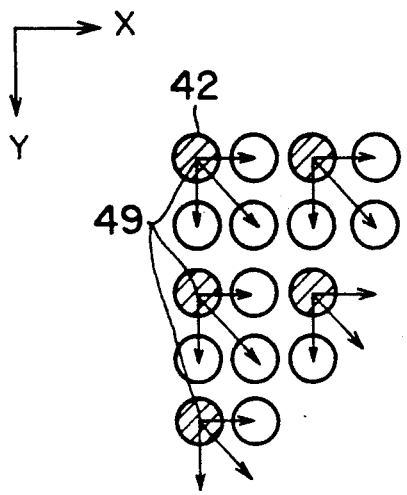
FIG. 12 is an explanatory diagram for description of a process for forming a double size enlargement.
Figure 14:
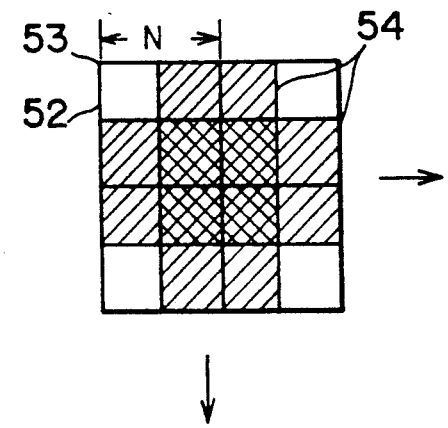
FIG. 14 is a view for description of the superposition of the local enlargement surface P'xy which constitutes an output image.
Figure 15:
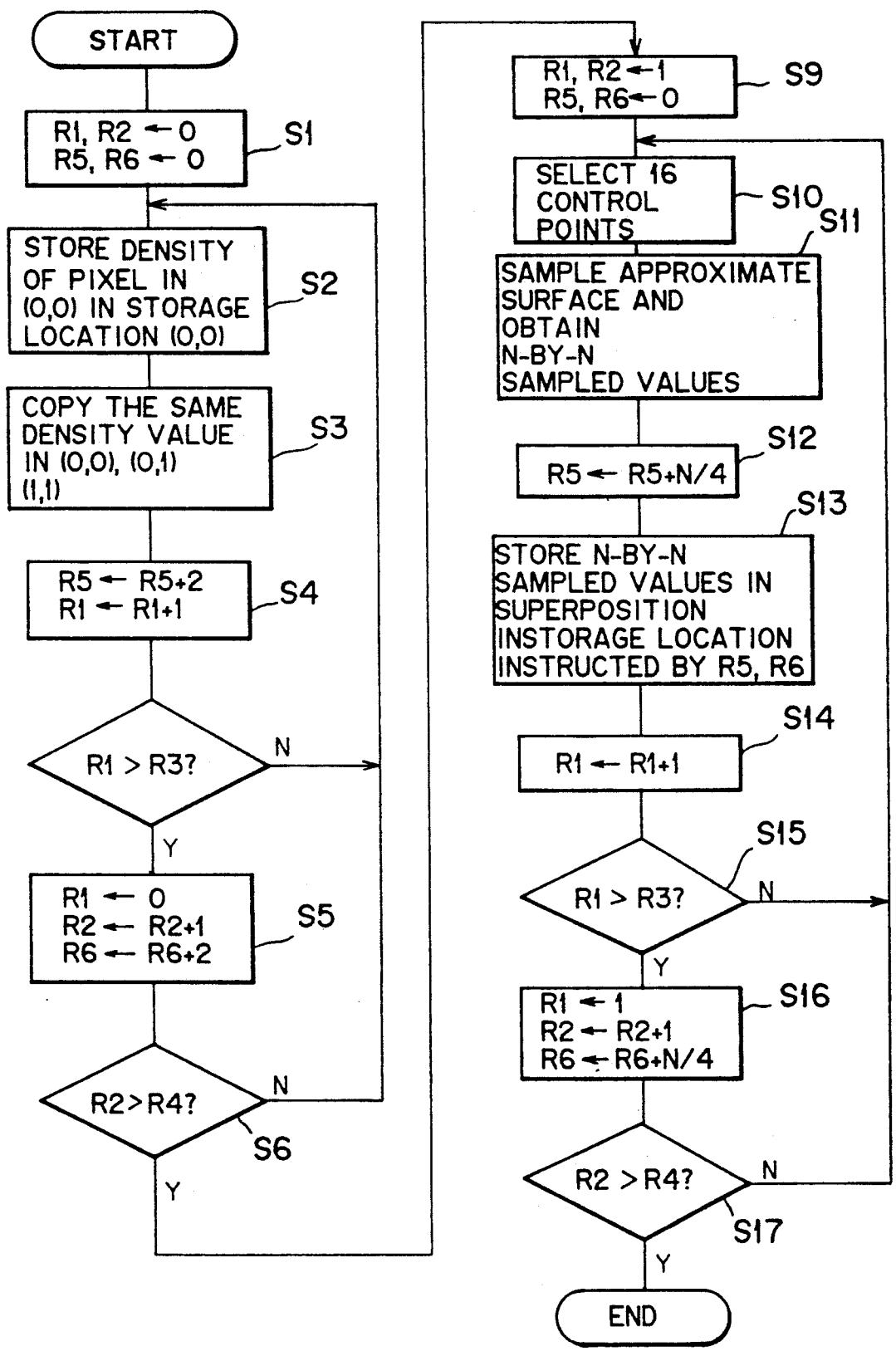
FIG. 15 is a flow chart for description of an operational sequence according to a second embodiment of the present invention.

Referring to the flow chart shown in FIG. 15, the resisters R1, R2, R5 and R6 are set to zero in step S1. Then, in step S2, the density value of a pixel 42 located in (0,0), that is the left-upper position as shown in FIG. 12, is stored in the storage location of (0, 0). In step S3, the density values of the pixel in (0, 0) position is copied in the storage locations of (1, 0), (0,1) and (1, 1) of the memory 20. As shown in FIG. 12, 3 additional pixels are inserted in the right, lower, and right lower position of the pixel 42. Next, the register R5 is incremented by 2 and the register R6 is incremented by 1 in step S4. The value of the register R1 and that of the register R3 is compared, if the former is greater than the latter, the value of the register R1 is reset and the value of the register R2 is incremented by 1. At the same time, the value of the register R6 is incremented by 2 in step S5. The processings from steps S2 through S5 are repeatedly carried out until the value of the register R2 becomes greater than that of the register R4 (step S6), whereupon 2-by-2 times enlarged image is obtained.

Next, operational sequence to obtain an enlarged output image will be described.

This time, the X-axis position of the pixel in the 2-by-2 times enlarged image is registered in the register R1, and the Y-axis position thereof in the register R2. The size of the 2-by-2 times enlarged image in the horizontal direction is registered in the register R3, and that in the vertical direction in the register R4. The X-axis position of the left upper position of the region 52 is registered in the register R5, and the Y-axis thereof in the register R6.

Figure 13:
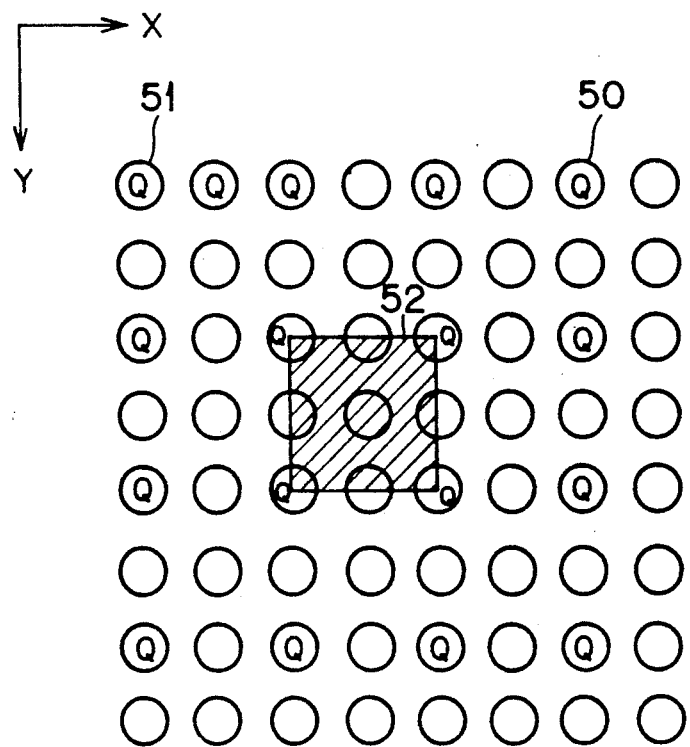
FIG. 13 is an explanatory diagram for description of a control point and local enlargement surface P'xy in case of the double size enlargement.

In step S9, the registers R1 and R2 are set to 1 and the registers R5 and R6 to 0 (zero). As shown in FIG. 13, 4-by-4 pixels alternately arranged on the 2-by-2 times enlarged image are selected as control points Q (step S10). Then, a bicubular spline surface is computed and is subjected to sampling to obtain N-by-N sampled values (step S11). Then, the value of the register R5 is incremented by N/4 (step S12). The the N-by-N sampled values are stored in superposition in the storage locations of the memory 20 as instructed by the registers R5 and R6 (step S13). Next, the value of the register R1 is incremented by 1 (step S14), and the value of the register R1 and that of the register R3 is compared in step S15. If the former is larger than the latter, the values of the register R1 is set to 1, the value of the register R2 is incremented by 1, and the value of the register R6 is incremented by N/4 (step S15). In step S17, the value of the register R2 and that of the register R4 is compared (step S17). If the former is larger than the latter, the values stored in the memory 20 are divided by four, thereby providing density values of the enlarged image. Otherwise, the routine returns to step S10 and repeates the same processing.

In the present invention as described above, high quality enlargement image without any jaggy line or curve can be provided even by the inputted digital image having low resolving power.

What is claimed is:

1. An image processing device for producing second digital data based upon first digital data, wherein the first digital data represents an original image composed of a first multiplicity of pixels arranged in row and column, each pixel having a density value, and the second digital data represents a C-by-C times enlarged image relative to a size of the original image, the C-by-C times enlarged image being composed of a second multiplicity of pixels arranged in row and column, each pixel having a density value, said device comprising:

storing means for storing the first digital data;

first computing means for computing a first approximate surface approximate to a surface covering all density values of first control points, a group of A-by-A adjacent pixels arranged in row and column being selected as the first control points from the first multiplicity of pixels, the first approximate surface having a center portion. A being an interger equal to or greater than 2;

first enlarging means for producing a 2-by-2 times enlarged center portion while sampling the center portion of the first approximate surface to obtain 2-by-2 sampled values;

second computing means for computing third digital data representative of a 2-by-2 times enlarged image by non-overlappingly combining the 2-by-2 times enlarged center portions produced by said first computing means and said first enlarging means while selecting different groups of A-by-A adjacent pixels arranged in row and column, said different groups of A-by-A adjacent pixels being displaced on pixel-to-pixel basis from said group of A-by-A adjacent pixels in directions of row and column, the 2-by-2 times enlarged image being composed of a third multiplicity of pixels arranged in row and column;

third computing means for computing a second approximate surface approximate to a surface covering all density values of second control points, a group of B-by-B pixels arranged alternately in row and column being selected as the second control points from the third multiplicity of pixels, the second approximate surface having a center portion corresponding to the center portion of the first approximate surface, B being an integer equal to or greater than 2;

second enlarging means for producing a C-by-C times enlarged center portion while sampling the center portion of the second approximate surface to obtain C-by-C sampled values, C being an integer equal to or greater than 2; and fourth computing means for computing the second digital data, wherein four C-by-C times enlarged center portions are produced by said third computing means and said second enlarging means with respect to each of the first multiplicity of pixels while selecting different groups of B-by-B pixels arranged alternately in row and column, said different groups of B-by-B alternately arranged pixels being displaced from said group of B-by-B alternately arranged pixels by one pixel in directions of row, column, and row and column, and an average value of four C-by-C times enlarged center portions is used as a basis for the second digital data.

2. An image processing device according to claim 1, wherein the first and second approximate sufaces are bicubical spline surfaces.

3. An image processing device according to claim 1, wherein the first and second approximate surfaces are bicubical Bezier surfaces.

4. An image processing device according to claim 1, wherein the first and second approximate surfaces are biquadratic surfaces.

5. An image processing device for producing second digital data based upon first digital data, wherein the first digital data represents an original image composed of a first multiplicity of pixels arranged in row and column, each pixel having a density value, and the second digital data represents a C-by-C times enlarged image relative to a size of the original image, the C-by-C times enlarged image being composed of a second multiplicity of pixels arranged in row and column, each pixel having a density value, said device comprising:

storing means for storing the first digital data;

producing means for producing 2-by-2 times enlarged image data by inserting new pixels to be arranged alternately with respect to the pixels of the arrangement of the original image, a density value of each of the newly inserted pixcel being equal to one of adjacent pixels;

first computing means for computing an approximate surface approximate to a surface covering the density values of control points, a group of B-by-B pixels arranged alternately in row and column and corresponding to the pixels of the original image being selected as the control points from the pixels of the 2-by-2 times enlarged image data, B being an integer equal to or greater than 2;

enlarging means for producing a C-by-C times enlarged center portion while sampling the center portion of the second approximate surface to obtain C-by-C sampled values, C being an integer equal to or greater than 2; and second computing means for computing the second digital data, wherein four C-by-C times enlarged center portions are produced by said second computing means and said enlarging means with respect to each of the first multiplicity of pixels while selecting different groups of B-by-B pixels arranged alternately in row and column, said different groups of B-by-B alternately arranged pixels being displaced from said group of B-by-B alternately arranged pixels by one pixel in directions of row, column, and row and column, and an average value of four C-by-C times enlarged center portions is used as a basis for the second digital data.

6. An image processing device according to claim 5, wherein the approximate suface is a bicubical spline surface.

7. An image processing device according to claim 5, wherein the approximate surface is a bicubical Bezier surface.

8. An image processing device according to claim 5, wherein the approximate surface is a biquadratic surface.

* * * * *